(12) United States Patent  
Xiong

(10) Patent No.: US 9,173,256 B1  
(45) Date of Patent: Oct. 27, 2015

(54) DIMMABLE LED DRIVER BASED ON PARALLEL RESONANT CURRENT FED SELF-OSCILLATING TOPOLOGY

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/334,180

(22) Filed: Jul. 17, 2014

Related U.S. Application Data

(60) Provisional application No. 61/847,724, filed on Jul. 18, 2013.

(51) Int. Cl.
*H05B 33/08* (2006.01)
*H05B 37/02* (2006.01)
*H02M 3/338* (2006.01)

(52) U.S. Cl.
CPC ............. *H05B 33/08* (2013.01); *H02M 3/3385* (2013.01); *H05B 37/0209* (2013.01)

(58) Field of Classification Search
CPC .............. H05B 33/08; H05B 33/0806; H05B 37/0209; H02M 3/3385; H02M 3/338
USPC ............................................... 315/201, 200 R
See application file for complete search history.

(56) References Cited

U.S. PATENT DOCUMENTS 8,299,727 B1 * 10/2012 Xiong et al. .................. 315/299
2011/0309760 A1 * 12/2011 Beland et al. ................. 315/201

* cited by examiner

*Primary Examiner* — Dylan White
(74) *Attorney, Agent, or Firm* — Patterson Intellectual Property Law, P.C.; Mark J. Patterson

(57) ABSTRACT

A driver circuit (e.g., an LED driver circuit) provides power to a load (e.g. an LED light source) from a DC power rail. A self-oscillating current fed parallel resonant inverter is configured to connect to the DC power rail, receive DC power from the DC power rail, and provide an AC output signal. A current limiting circuit is connected to the self-oscillating current fed parallel resonant inverter. The current limiting circuit receives the AC output signal from the self-oscillating current fed parallel resonant inverter and provides an AC current signal as a function of the DC current provided to the load by the driver circuit. The rectifier receives the AC current signal from the current limiting circuit and provides a DC current to the load.

20 Claims, 1 Drawing Sheet

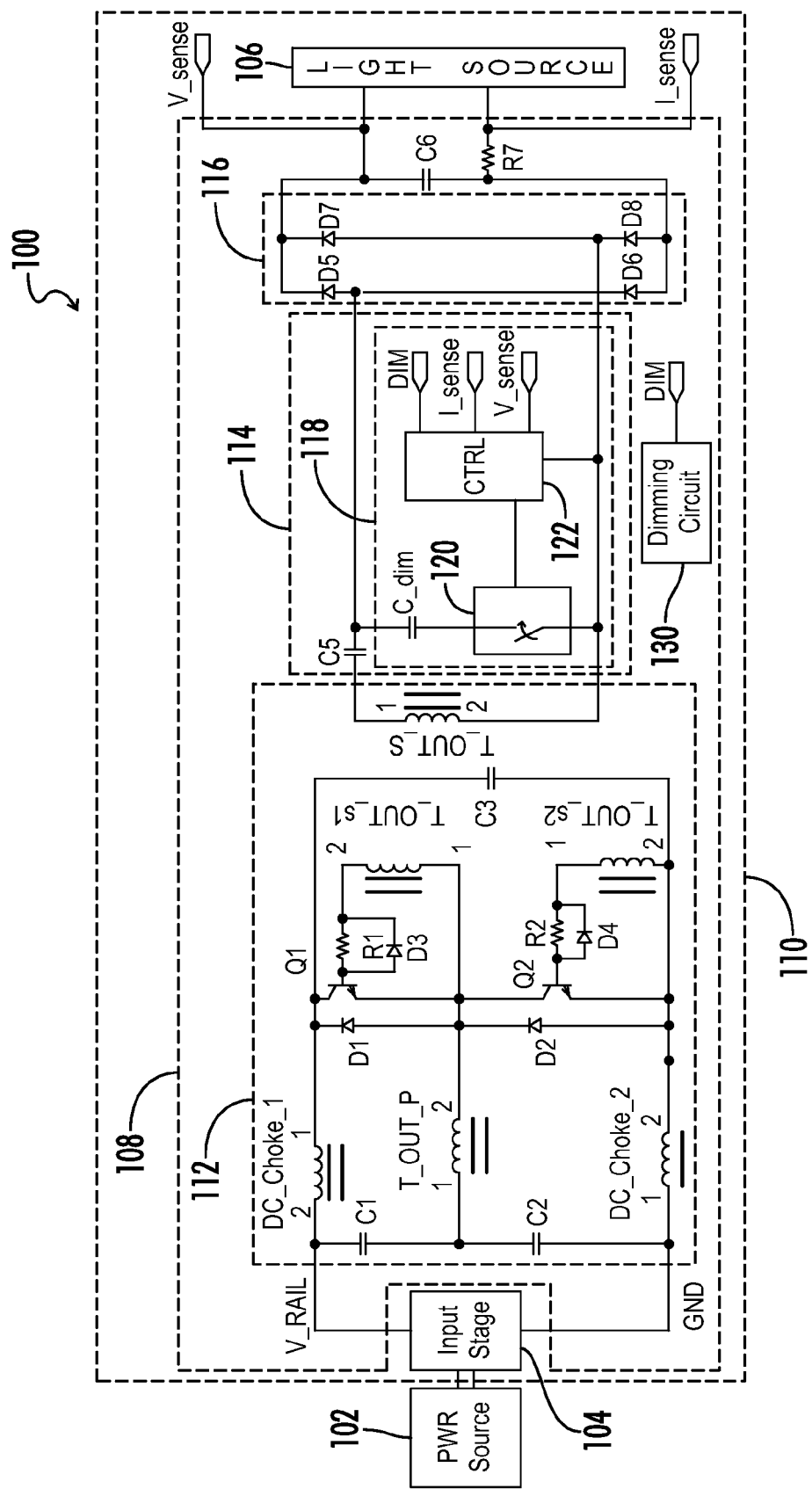

DIMMABLE LED DRIVER BASED ON PARALLEL RESONANT CURRENT FED SELF-OSCILLATING TOPOLOGY

CROSS-REFERENCES TO RELATED APPLICATIONS

This application claims priority to and hereby incorporates by reference in its entirety U.S. Provisional Patent Application Ser. No. 61/847,724 entitled "DIMMABLE LED DRIVER BASED ON PARALLEL RESONANT CURRENT FED SELF-OSCILLATING TOPOLOGY" filed on Jul. 18, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to direct current (DC) constant current driver circuits. More particularly, this invention pertains to voltage and current limited constant current DC driver circuits.

Light emitting diodes (LEDs) provide light in response to receiving a DC current (assuming proper bias) and in proportion to the received DC current. Resistance of an LED light source fluctuates. Therefore, constant current driver circuits are preferred with LED based light sources. Underwriters Laboratories (UL) class II standards for LED driver circuits require that the driver circuit have an isolated output, pass a short circuit test, provide a controlled (i.e., limited) output voltage, and provide a constant current. Generally, UL class II LED driver circuits are also dimmable. That is, the magnitude of the constant output current may be varied by the driver circuit to match a target current, thereby matching a target brightness output level for the LED light source.

BRIEF SUMMARY OF THE INVENTION

Aspects of the present invention provide a voltage and current limited, constant current DC driver circuit. The driver circuit is based on a self-oscillating current fed parallel resonant inverter and includes additional alternating current (AC) current limiting circuitry to regulate output current from the self-oscillating current fed parallel resonant inverter to the load or light source.

In one aspect, a driver circuit is operable to provide power to a load from a DC power rail. The driver circuit includes a self-oscillating current fed parallel resonant inverter, a current limiting circuit, and a rectifier. The self-oscillating current fed parallel resonant inverter is configured to connect to the DC power rail, receive DC power from the DC power rail, and provide an alternating current (AC) output signal. The current limiting circuit is connected to the self-oscillating current fed parallel resonant inverter. The current limiting circuit is configured to receive the AC output signal from the self-oscillating current fed parallel resonant inverter and provide an AC current signal as a function of the DC current provided to the load by the driver circuit. The rectifier is connected to the current limiting circuit. The rectifier is operable to receive the AC current signal from the current limiting circuit and provide the DC current to the load.

In another aspect, a light fixture is operable to receive power from a power source and provide light. The light fixture includes an input stage, a light source, a driver circuit, and a housing. The input stage is operable to receive power from the power source and provide a DC power rail. The DC power rail has a substantially constant DC voltage. The light source is operable to provide light in response to receiving power. The driver circuit is operable to provide power to the light source from the DC power rail. The housing is operable to support the input stage, the light source, and the driver circuit. The driver circuit includes a self-oscillating current fed parallel resonant inverter, a current limiting circuit, and a rectifier. The self-oscillating current fed parallel resonant converter is connected to the DC power rail. The self-oscillating current fed parallel resonant inverter is configured to receive DC power from the DC power rail and provide an AC output signal. The current limiting circuit is connected to the self-oscillating current fed parallel resonant inverter. The current limiting circuit is configured to receive the AC output signal from the self-oscillating current fed parallel resonant inverter and provide an AC current signal as a function of the DC current provided to the light source by the driver circuit. The rectifier is connected to the current limiting circuit. The rectifier is operable to receive the AC current signal from the current limiting circuit and provide the DC current light source.

BRIEF DESCRIPTION OF THE SEVERAL VIEWS OF THE DRAWINGS

FIG. 1 is a block and partial schematic diagram of an embodiment of a light fixture including a driver circuit based on a self-oscillating current fed parallel resonant inverter in accordance with the present invention.

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids.

In one embodiment, a voltage limited constant current driver circuit is based on a self-oscillating current fed parallel resonant inverter topology. The self-oscillating current fed parallel resonant inverter provides a constant alternating current (AC) voltage output (i.e. voltage limited output). A current limiting capacitor and a rectifier convert the constant voltage AC output from the self-oscillating current fed parallel resonant inverter into a direct current (DC) output having a constant current. An optional output current regulator may be used to reduce AC current provided from the current limiting capacitor to the rectifier and therefore the magnitude of the constant DC current provided to a load (e.g., light source). The self-oscillating current fed parallel resonant inverter inherently provides an isolated output.

Referring to FIG. 1, a light fixture 100 is operable to receive power from a power source 102 and provide light. The light fixture 100 includes an input stage 104, a light source 106, a driver circuit 108, and a housing 110. The housing 110 supports the input stage 104, the light source 106, and the driver circuit 108. The light source 106 is operable to provide light in response to receiving power. The power source 102 may be for example, alternating current (AC) line power (e.g., a power line at 120V AC, 60 Hertz). The input stage 104 is operable to receive power from the power source 102 and provide a direct current (DC) power rail V_RAIL. In one embodiment, the input stage 104 is a power factor correcting AC to DC converter.

In another embodiment, when the power source 102 is a DC power source, the input stage 104 may be a DC regulator and/or DC to DC converter. The driver circuit 108 is operable to provide power to the light source 106 from the DC power rail V_RAIL. In one embodiment, the light source 106 includes at least one light emitting diode, and may include a plurality of light emitting diodes connected in series and/or parallel. Although described herein in the context of a light fixture, it is contemplated that the driver circuit 108 may be used to drive loads other than light sources.

The driver circuit 108 includes a self-oscillating current fed parallel resonant inverter 112, a current limiting circuit 114, and a rectifier 116. The driver circuit 108 may also include an output capacitor C6 connected in parallel with the light source 106. The self-oscillating current fed parallel resonant inverter 112 is connected to the DC power rail V_RAIL. Self-oscillating current fed parallel resonant inverter 112 is configured to receive DC power from the DC power rail V_RAIL and provide an AC output signal. In one embodiment, the DC power rail V_RAIL has an associated ground GND, and the self-oscillating current fed parallel resonant inverter 112 includes a first capacitor C1, a second capacitor C2, a first DC choke DC_Choke_1, a first diode D1, a first switch Q1, a second DC choke DC_Choke_2, a second diode D2, a second switch Q2, a third capacitor C3, and a transformer T_OUT. The first capacitor C1 has a first terminal connected to the DC power rail V_RAIL. The second capacitor C2 has a first terminal connected to a second terminal of the first capacitor C1 and a second terminal connected to the ground GND associated with the DC power rail V_RAIL.

In one embodiment, the first capacitor C1 and the second capacitor C2 are electrolytic capacitors of equal value. The first DC choke DC_Choke_1 has a first terminal connected to the first terminal of the first capacitor C1 (e.g., to the DC power rail V_RAIL). The first diode D1 has a cathode connected to a second terminal of the first DC choke DC_Choke_1. The first switch Q1 has a first terminal, a second terminal, and a control terminal. The first terminal of the first switch Q1 is connected to the second terminal of the first DC choke DC_Choke_1, and the second terminal of the first switch Q1 is connected to an anode of the first diode D1. The second DC choke DC_Choke_2 has a first terminal connected to the second terminal of the second capacitor C2. The second diode D2 has a cathode connected to the anode of the first diode D1 and an anode connected to the second terminal of the second DC choke DC_Choke_2. The second switch Q2 has a first terminal, a second terminal, and a control terminal. The first terminal of the second switch Q2 is connected to the cathode of the second diode D2, and the second terminal is connected to the anode of the second diode D2. The third capacitor C3 has a first terminal connected to the cathode of the first diode D1 and a second terminal connected to the anode of the second diode D2. In one embodiment, the first switch Q1 and the second switch Q2 are bipolar junction transistors, and the first diode D1 and second diode D2 are freewheeling diodes for the first switch Q1 and second switch Q2.

The transformer T_OUT of the self-oscillating current fed parallel resonant inverter 112 has a primary T_OUT_P, a first secondary T_OUT_S1, a second secondary T_OUT_S2, and an output secondary T_OUT_S. The primary T_OUT_P of the transformer T_OUT is connected between the second terminal of the first capacitor C1 and the anode of the first diode D1. The first secondary T_OUT_S1 is connected between the control terminal of the first switch Q1 and the anode of the first diode D1. The second secondary T_OUT_S2 is connected between the control terminal of the second switch Q2 and the anode of the second diode D2. The output secondary T_OUT_S is configured to provide the AC output signal of the self-oscillating current fed parallel resonant inverter 112. In one embodiment, the AC output signal of the self-oscillating current fed parallel resonant converter 112 is a constant output voltage AC voltage source. As seen in Equation 1, a voltage of the AC output signal varies only as a function of the voltage of the DC power rail V_RAIL, where $V_{s\_rms}$ is the voltage of the AC output signal and N is the turns ratio of the transformer T_OUT.

$$V_{s\_rms} = \frac{\pi \cdot V_{rail}/4 \cdot \sqrt{2}}{N} \quad \text{EQUATION 1}$$

Optionally, the self-oscillating current fed parallel resonant inverter may further include a first base drive resistor R1, a second base drive resistor R2, a diode D3, and a fourth diode D4. The first base drive resistor R1 is connected in series with the first secondary T_OUT_S1 of the transformer T_OUT between the anode of the first diode D1 and the control terminal of the first switch Q1. The second base drive resistor R2 is connected in series with the second secondary T_OUT_S2 of the transformer T_OUT between the anode of the second diode D2 and the control terminal of the second switch Q2. The third diode D3 has an anode connected to the control terminal of the first switch Q1. The third diode D3 is connected in parallel with the first base drive resistor R1 such that a cathode of the third diode D3 is connected to the first secondary T_OUT_S1 of the transformer T_OUT. The fourth diode D4 has an anode connected to the control terminal of the second switch Q2. The fourth diode D4 is connected in parallel with the second base drive resistor R2 such that a cathode of the fourth diode D for is connected to the second secondary T_OUT_S2 of the transformer T_OUT. In one embodiment, the third diode D3 in the fourth diode D4 are used to decrease the shut off times of the first switch Q1 and the second switch Q2, respectively.

The current limiting circuit 114 is connected to the self-oscillating current fed parallel resonant inverter 112. The current limiting circuit 114 is configured to receive the AC output signal from the self-oscillating current fed parallel resonant inverter 112 (i.e., from the output secondary T_OUT_S of the transformer T_OUT) and provide an AC current signal as a function of a DC current provided to the light source 106 by the driver circuit 108. In one embodiment, the driver circuit 108 includes a current sensing resistor R7 connected in series with the light source 106. The current sensing resistor R7 provides a current sensing signal indicative of the DC current provided to the light source 106 by the driver circuit 108. In one embodiment, the current limiting circuit 114 includes a current limiting capacitor C5 and an output current regulator 118. The current limiting capacitor C5 has a first terminal connected to a first terminal of the output secondary T_OUT_S of the transformer T_OUT and a second terminal connected to the rectifier 116. As seen in Equation 2, the current limiting capacitor C5 controls the maximum DC current output of the driver circuit 108 wherein $F_{op}$ is an operating frequency of the self-oscillating current fed parallel resonant inverter.

$$I_{out\_DC\_max} = \frac{2 \cdot \sqrt{2}}{\pi} \cdot \frac{\frac{\pi \cdot V_{rail}/4 \cdot \sqrt{2}}{N}}{\frac{1}{j \cdot 2 \cdot \pi \cdot f_{op} \cdot C_5}} \quad \text{EQUATION 2}$$

The output current regulator 118 is connected between the second terminal of the current limiting capacitor C5 and the second terminal of the output secondary T_OUT_S of the transformer T_OUT. The output current regulator 118 includes a dimming capacitor C_dim, a bidirectional switch 120, and a controller 122. The dimming capacitor C_dim and the bidirectional switch 120 are connected in series between the second terminal of the current limiting capacitor C5 and the second terminal of the output secondary T_OUT_S of the transformer T_OUT. The driver circuit 108 may also include a dimming circuit 130 operable to provide a target current signal indicative of a target current. The target current (e.g., the brightness of the light source 106) may be established by manual intervention at the light fixture 100, via an external controller, or via network based control. The controller 122 is operable to provide a pulse width modulated signal to the bidirectional switch 120 (i.e., to a control terminal of the bidirectional switch 120) as a function of the DC current provided to the light source 106 by the driver circuit 108. The controller 122 may also adjust a duty cycle and/or frequency of the pulse width modulated signal as a function of a voltage across the light source 106 and the target current indicated by the target current signal provided by the dimming circuit 130. As seen in Equation 3, the controller 122 can control the DC output of the driver circuit 108 to maintain the DC output current to the light source 106 near zero (see Equation 3) for a relatively large value of the dimming capacitor C_dim, where $R_{load}$ is the resistance of the load or light source 106 and $I_{out\_DC\_min}$ is the minimum DC output current.

$$I_{out\_DC\_min} = \frac{2 \cdot \sqrt{2}}{\pi} \cdot \frac{\frac{\pi \cdot V_{rail}/4 \cdot \sqrt{2}}{N}}{\frac{1}{j \cdot 2 \cdot \pi \cdot f_{op} \cdot C_5} + R_{load} \cdot \frac{\frac{1}{j \cdot 2 \cdot \pi \cdot f_{op} \cdot C_{dim}}}{\frac{1}{j \cdot 2 \cdot \pi \cdot f_{op} \cdot C_{dim}} + R_{load}}} \cdot \frac{\frac{1}{j \cdot 2 \cdot \pi \cdot f_{op} \cdot C_{dim}}}{\frac{1}{j \cdot 2 \cdot \pi \cdot f_{op} \cdot C_{dim}} + R_{load}} \text{As As} \quad \text{EQUATION 3}$$

seen in Equation 4, the DC output current of the driver circuit 108 is determined as a function of the duty cycle D of the bidirectional switch 120 as set by the controller 122 wherein $I_{out\_DC}$ is the magnitude of the DC output current.

$$I_{out\_DC} = (1-D) \cdot I_{out\_DC\_max} + D \cdot I_{out\_DC\_min} \quad \text{EQUATION 4:}$$

The rectifier 116 is connected between the current limiting circuit 114 and the load (i.e., light source 106). The rectifier 116 is operable to receive the AC current signal from the current limiting circuit 114 and provide the DC current to the light source 106. In one embodiment, the rectifier 116 is a full wave rectifier having a first input connected to the second terminal of the dimming capacitor C5 and a second input connected to the second terminal of the output secondary T_OUT_S of the transformer T_OUT. The rectifier 116 has a first output connected to the light source 106, and a second output connected to the light source 106 via the current sensing resistor R7. The output capacitor C6 is connected between the first output of the rectifier 116 and the second output of the rectifier 116.

Various components herein are described as having first and second terminals. These descriptions are not necessarily indicative of component polarity or orientation. Orientations shown on the attached drawings by pin number or other marking are indicative of component polarity or orientation of the illustrated embodiment.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful DIMMABLE LED DRIVER BASED ON PARALLEL RESONANT CURRENT FED SELF-OSCILLATING TOPOLOGY it is not intended that such references be construed as limitations upon the scope of this invention except as set forth in the following claims.

What is claimed is:

1. A driver circuit operable to provide power to a load from a direct current (DC) power rail, said driver circuit comprising:
 a self-oscillating, current-fed parallel resonant inverter configured to connect to the DC power rail, receive DC power from the DC power rail, and provide an alternating current (AC) output signal;
 a current limiting circuit connected to the self-oscillating current fed parallel resonant inverter, wherein the current limiting circuit is configured to receive the AC output signal from the self-oscillating current fed parallel resonant inverter and provide an AC current signal as a function of a DC current provided to the load by the driver circuit; and
 a rectifier connected to the current limiting circuit, wherein the rectifier is operable to receive the AC current signal from the current limiting circuit and provide a DC current to the load.

2. The driver circuit of claim 1, further comprising:
 a current sensing resistor operable to connect in series with the load and provide to the current limiting circuit a current sensing signal indicative of the DC current provided to the load by the driver circuit.

3. The driver circuit of claim 1, wherein the DC power rail has an associated ground, and the self-oscillating current fed parallel resonant inverter comprises:
- a first capacitor having a first terminal connected to the DC power rail;
- a second capacitor having a first terminal connected to a second terminal of the first capacitor and a second terminal connected to the ground associated with the DC power rail;
- a first DC choke having a first terminal connected to the first terminal of the first capacitor;
- a first diode having a cathode connected to a second terminal of the first DC choke;
- a first switch having a first terminal, a second terminal, and a control terminal, wherein the first terminal is connected to the second terminal of the first DC choke, and the second terminal is connected to an anode of the first diode;
- a second DC choke having a first terminal connected to the second terminal of the second capacitor;
- a second diode having a cathode connected to the anode of the first diode and an anode connected to the second terminal of the second DC choke;
- a second switch having a first terminal, a second terminal, and a control terminal, wherein the first terminal is connected to the cathode of the second diode and the second terminal is connected to the anode of the second diode;
- a third capacitor having a first terminal connected to the cathode of the first diode and a second terminal connected to the anode of the second diode; and
- a transformer having a primary, a first secondary, a second secondary, and an output secondary, wherein:
  - the primary of the transformer is connected between the second terminal of the first capacitor and the anode of the first diode;
  - the first secondary is connected between the control terminal of the first switch and the anode of the first diode;
  - the second secondary is connected between the control terminal of the second switch and the anode of the second diode; and
  - the output secondary is operable to provide the AC output signal.

4. The driver circuit of claim 3, wherein the self-oscillating current fed parallel resonant inverter further comprises:
- a first base drive resistor connected in series with the first secondary of the transformer between the anode of the first diode and the control terminal of the first switch; and
- a second base drive resistor connected in series with the second secondary of the transformer between the anode of the second diode and the control terminal of the second switch.

5. The driver circuit of claim 3, wherein the self-oscillating current fed parallel resonant inverter further comprises:
- a first base drive resistor connected in series with the first secondary of the transformer between the anode of the first diode and the control terminal of the first switch;
- a second base drive resistor connected in series with the second secondary of the transformer between the anode of the second diode and the control terminal of the second switch;
- a third diode having an anode connected to the control terminal of the first switch, wherein the third diode is connected in parallel with the first base drive resistor such that a cathode of the third diode is connected to the first secondary of the transformer; and
- a fourth diode having an anode connected to the control terminal of the second switch, wherein the fourth diode is connected in parallel with the second base drive resistor such that a cathode of the fourth diode is connected to the second secondary of the transformer.

6. The driver circuit of claim 1, wherein the AC output signal has a substantially constant alternating current (AC) voltage.

7. The driver circuit of claim 1, wherein the self-oscillating current fed parallel resonant inverter comprises a transformer having an output secondary, the output secondary has a first terminal and a second terminal, and the current limiting circuit comprises:
- a current limiting capacitor having a first terminal connected to the first terminal of the output secondary of the transformer and a second terminal connected to the rectifier.

8. The driver circuit of claim 1, wherein the self-oscillating current fed parallel resonant inverter comprises a transformer having an output secondary, the output secondary has a first terminal and a second terminal, and the current limiting circuit comprises:
- a current limiting capacitor having a first terminal connected to the first terminal of the output secondary of the transformer and a second terminal connected to the rectifier; and
- an output current regulator connected between the second terminal of the current limiting capacitor and the second terminal of the output secondary of the transformer, said output current regulator comprising:
  - a dimming capacitor;
  - a bidirectional switch connected in series with the dimming capacitor between the second terminal of the current limiting capacitor and the second terminal of the output secondary of the transformer; and
  - a controller operable to provide a pulse width modulated signal to the bidirectional switch as a function of the DC current provided to the load by the driver circuit.

9. The driver circuit of claim 1, wherein the driver circuit further comprises a dimming circuit operable to provide a target current signal indicative of a target current, the self-oscillating current fed parallel resonant inverter comprises a transformer having an output secondary, the output secondary has a first terminal and a second terminal, and the current limiting circuit comprises:
- a current limiting capacitor having a first terminal connected to the first terminal of the output secondary of the transformer and a second terminal connected to the rectifier; and
- an output current regulator connected between the second terminal of the current limiting capacitor and the second terminal of the output secondary of the transformer, said output current regulator comprising:
  - a dimming capacitor;
  - a bidirectional switch connected in series with the dimming capacitor between the second terminal of the current limiting capacitor and the second terminal of the output secondary of the transformer; and
  - a controller configured to provide a pulse width modulated signal to the bidirectional switch as a function of the DC current provided to the load by the driver circuit and the target current indicated by the target current signal provided by the dimming circuit.

10. The driver circuit of claim 1, wherein:
the rectifier is a full wave rectifier;
the driver circuit further comprises an output capacitor connected in parallel with the load; and the load is a light source comprising at least one light emitting diode.

11. A light fixture operable to receive power from a power source and provide light, said light fixture comprising:
an input stage operable to receive power from the power source and provide a direct current (DC) power rail, wherein the DC power rail has a substantially constant DC voltage;
a light source operable to provide light in response to receiving power;
a driver circuit operable to provide power to the light source from the DC power rail, said driver circuit comprising:
a self-oscillating current fed parallel resonant inverter connected to the DC power rail, wherein the self-oscillating current fed parallel resonant inverter is configured to receive DC power from the DC power rail, and provide an alternating current (AC) output signal;
a current limiting circuit connected to the self-oscillating current fed parallel resonant inverter, wherein the current limiting circuit is configured to receive the AC output signal from the self-oscillating current fed parallel resonant inverter and provide an AC current signal as a function of a DC current provided to the light source by the driver circuit; and
a rectifier connected to the current limiting circuit, wherein the rectifier is operable to receive the AC current signal from the current limiting circuit and provide a DC current to the light source; and
a housing operable to support the input stage, the light source and the driver circuit.

12. The light fixture of claim 11, wherein the driver circuit further comprises:
a current sensing resistor operable to connect in series with the light source and provide to the current limiting circuit a current sensing signal indicative of the DC current provided to the light source by the driver circuit.

13. The light fixture of claim 11, wherein the DC power rail has an associated ground, and the self-oscillating current fed parallel resonant inverter comprises:
a first capacitor having a first terminal connected to the DC power rail;
a second capacitor having a first terminal connected to a second terminal of the first capacitor and a second terminal connected to the ground associated with the DC power rail;
a first DC choke having a first terminal connected to the first terminal of the first capacitor;
a first diode having a cathode connected to a second terminal of the first DC choke;
a first switch having a first terminal, a second terminal, and a control terminal, wherein the first terminal is connected to the second terminal of the first DC choke, and the second terminal is connected to an anode of the first diode;
a second DC choke having a first terminal connected to the second terminal of the second capacitor;
a second diode having a cathode connected to the anode of the first diode and an anode connected to the second terminal of the second DC choke;
a second switch having a first terminal, a second terminal, and a control terminal, wherein the first terminal is connected to the cathode of the second diode and the second terminal is connected to the anode of the second diode;
a third capacitor having a first terminal connected to the cathode of the first diode and a second terminal connected to the anode of the second diode; and
a transformer having a primary, a first secondary, a second secondary, and an output secondary, wherein:
the primary of the transformer is connected between the second terminal of the first capacitor and the anode of the first diode;
the first secondary is connected between the control terminal of the first switch and the anode of the first diode;
the second secondary is connected between the control terminal of the second switch and the anode of the second diode; and
the output secondary is operable to provide the AC output signal.

14. The light fixture of claim 13, wherein the self-oscillating current fed parallel resonant inverter further comprises:
a first base drive resistor connected in series with the first secondary of the transformer between the anode of the first diode and the control terminal of the first switch; and
a second base drive resistor connected in series with the second secondary of the transformer between the anode of the second diode and the control terminal of the second switch.

15. The light fixture of claim 13, wherein the self-oscillating current fed parallel resonant inverter further comprises:
a first base drive resistor connected in series with the first secondary of the transformer between the anode of the first diode and the control terminal of the first switch;
a second base drive resistor connected in series with the second secondary of the transformer between the anode of the second diode and the control terminal of the second switch;
a third diode having an anode connected to the control terminal of the first switch, wherein the third diode is connected in parallel with the first base drive resistor such that a cathode of the third diode is connected to the first secondary of the transformer; and
a fourth diode having an anode connected to the control terminal of the second switch, wherein the fourth diode is connected in parallel with the second base drive resistor such that a cathode of the fourth diode is connected to the second secondary of the transformer.

16. The light fixture of claim 11, wherein the AC output signal has a substantially constant alternating current (AC) voltage.

17. The light fixture of claim 11, wherein the self-oscillating current fed parallel resonant inverter comprises a transformer having an output secondary, the output secondary has a first terminal and a second terminal, and the current limiting circuit comprises:
a current limiting capacitor having a first terminal connected to the first terminal of the output secondary of the transformer and a second terminal connected to the rectifier.

18. The light fixture of claim 11, wherein the self-oscillating current fed parallel resonant inverter comprises a transformer having an output secondary, the output secondary has a first terminal and a second terminal, and the current limiting circuit comprises:
a current limiting capacitor having a first terminal connected to the first terminal of the output secondary of the transformer and a second terminal connected to the rectifier; and an output current regulator connected between the second terminal of the current limiting capacitor and the second terminal of the output secondary of the transformer, said output current regulator comprising:

a dimming capacitor;

a bidirectional switch connected in series with the dimming capacitor between the second terminal of the current limiting capacitor and the second terminal of the output secondary of the transformer; and a controller operable to provide a pulse width modulated signal to the bidirectional switch as a function of the DC current provided to the light source by the driver circuit.

19. The light fixture of claim 11, wherein the driver circuit further comprises a dimming circuit operable to provide a target current signal indicative of a target current, the self-oscillating current fed parallel resonant inverter comprises a transformer having an output secondary, the output secondary has a first terminal and a second terminal, and the current limiting circuit comprises:

a current limiting capacitor having a first terminal connected to the first terminal of the output secondary of the transformer and a second terminal connected to the rectifier; and an output current regulator connected between the second terminal of the current limiting capacitor and the second terminal of the output secondary of the transformer, said output current regulator comprising:

a dimming capacitor;

a bidirectional switch connected in series with the dimming capacitor between the second terminal of the current limiting capacitor and the second terminal of the output secondary of the transformer; and a controller configured to provide a pulse width modulated signal to the bidirectional switch as a function of the DC current provided to the light source by the driver circuit and the target current indicated by the target current signal provided by the dimming circuit.

20. The light fixture of claim 11, wherein:

the rectifier is a full wave rectifier;

the driver circuit further comprises an output capacitor connected in parallel with the light source;

the light source comprises at least one light emitting diode;

the power source is AC line power; and the input stage is a power factor correcting AC to DC converter.

* * * * *